United States Patent
Kelley et al.

(10) Patent No.: US 11,232,436 B1
(45) Date of Patent: Jan. 25, 2022

(54) TECHNICAL SOLUTIONS TO LOST CREDIT CARDS

(71) Applicant: United Services Automobile Association (USAA), San Antonio, TX (US)

(72) Inventors: Christopher Patrick Kelley, Austin, TX (US); Jarrod Lawrence Joplin, Austin, TX (US); Daniel Ronald Zaharia, Austin, TX (US); Carly Jean Stevens, Austin, TX (US); Sean Holstien, Irvine, CA (US); Cornelius Williams, San Antonio, TX (US); Trisha Suzanne Mock, Austin, TX (US); Jo Anne Yau, San Antonio, TX (US); Marisa Pruski, Schertz, TX (US); Jeremy Michael Burns, San Antonio, TX (US); Corinne Burrows Schuster, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/555,778

(22) Filed: Aug. 29, 2019

Related U.S. Application Data

(60) Provisional application No. 62/725,067, filed on Aug. 30, 2018.

(51) Int. Cl.
*G06Q 20/36* (2012.01)
*G06Q 20/32* (2012.01)
(Continued)

(52) U.S. Cl.
CPC ....... *G06Q 20/367* (2013.01); *G06F 3/04817* (2013.01); *G06Q 20/1085* (2013.01);
(Continued)

(58) Field of Classification Search
CPC .... G06Q 20/40; G06Q 20/18; G06Q 20/1085; G06Q 20/367; G06Q 20/3221; G06Q 20/354; G06Q 20/385; G06F 3/04817
See application file for complete search history.

(56) References Cited

U.S. PATENT DOCUMENTS 8,781,953 B2 * 7/2014 Kasower .............. G06Q 20/385
705/38
9,842,330 B1 * 12/2017 Van Os .............. G06Q 20/4014
(Continued)

FOREIGN PATENT DOCUMENTS

IT             7946502      *   1/1979

*Primary Examiner* — Joseph W. King
*Assistant Examiner* — Pierre L Maccagno
(74) *Attorney, Agent, or Firm* — Fish & Richardson P.C.

(57) ABSTRACT

Methods, systems, and apparatus, including computer programs encoded on computer storage media can be used to facilitate information and access to accounts. One of the methods includes in response to determining that a user has reported a card associated with an account as lost or stolen, providing a user interface option to associate the account with a digital wallet. The method includes in response to receiving a request from a user associating the accord with the digital wallet absent associating a card associated with the account with the digital wallet.

19 Claims, 11 Drawing Sheets

(51) Int. Cl.
*G06F 3/0481* (2013.01)
*G06Q 20/38* (2012.01)
*G06Q 20/10* (2012.01)
*G06Q 20/34* (2012.01)

(52) U.S. Cl.
CPC ....... *G06Q 20/3221* (2013.01); *G06Q 20/354* (2013.01); *G06Q 20/385* (2013.01)

(56) References Cited

U.S. PATENT DOCUMENTS

| | | | |
|---|---|---|---|
| 10,255,598 B1* | 4/2019 | Dean | G06Q 20/00 |
| 10,366,387 B2* | 7/2019 | Aabye | G06Q 20/40 |
| 10,475,009 B2* | 11/2019 | Recriwal | G06Q 20/1085 |
| 2014/0129457 A1* | 5/2014 | Peeler | G06Q 10/067 |
| | | | 705/317 |
| 2016/0012465 A1* | 1/2016 | Sharp | G06Q 20/386 |
| | | | 705/14.17 |
| 2019/0050438 A1* | 2/2019 | Fast | H04L 67/18 |
| 2019/0180258 A1* | 6/2019 | Amar | G06F 3/0482 |
| 2020/0019944 A1* | 1/2020 | Recriwal | G06Q 20/32 |

\* cited by examiner

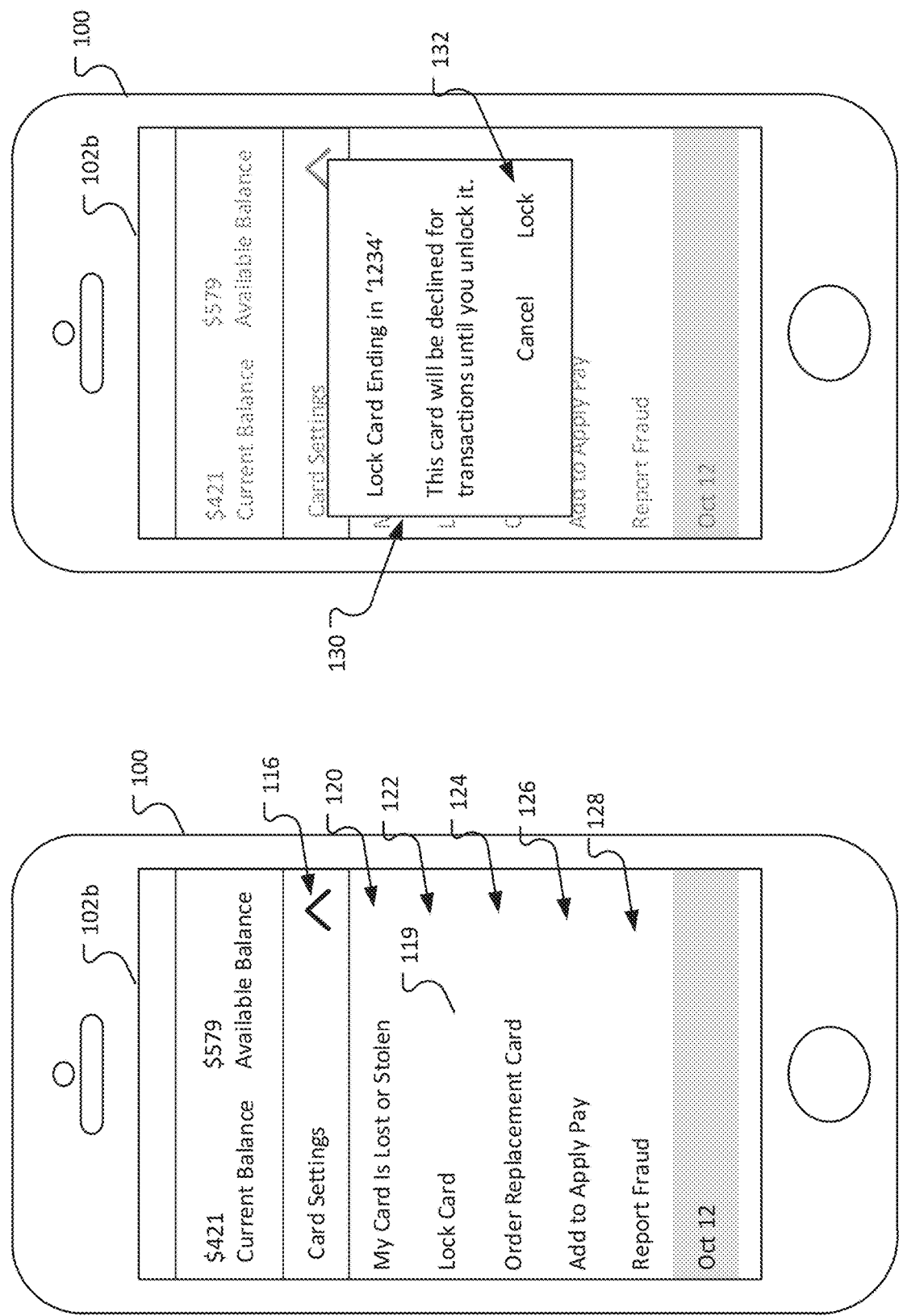

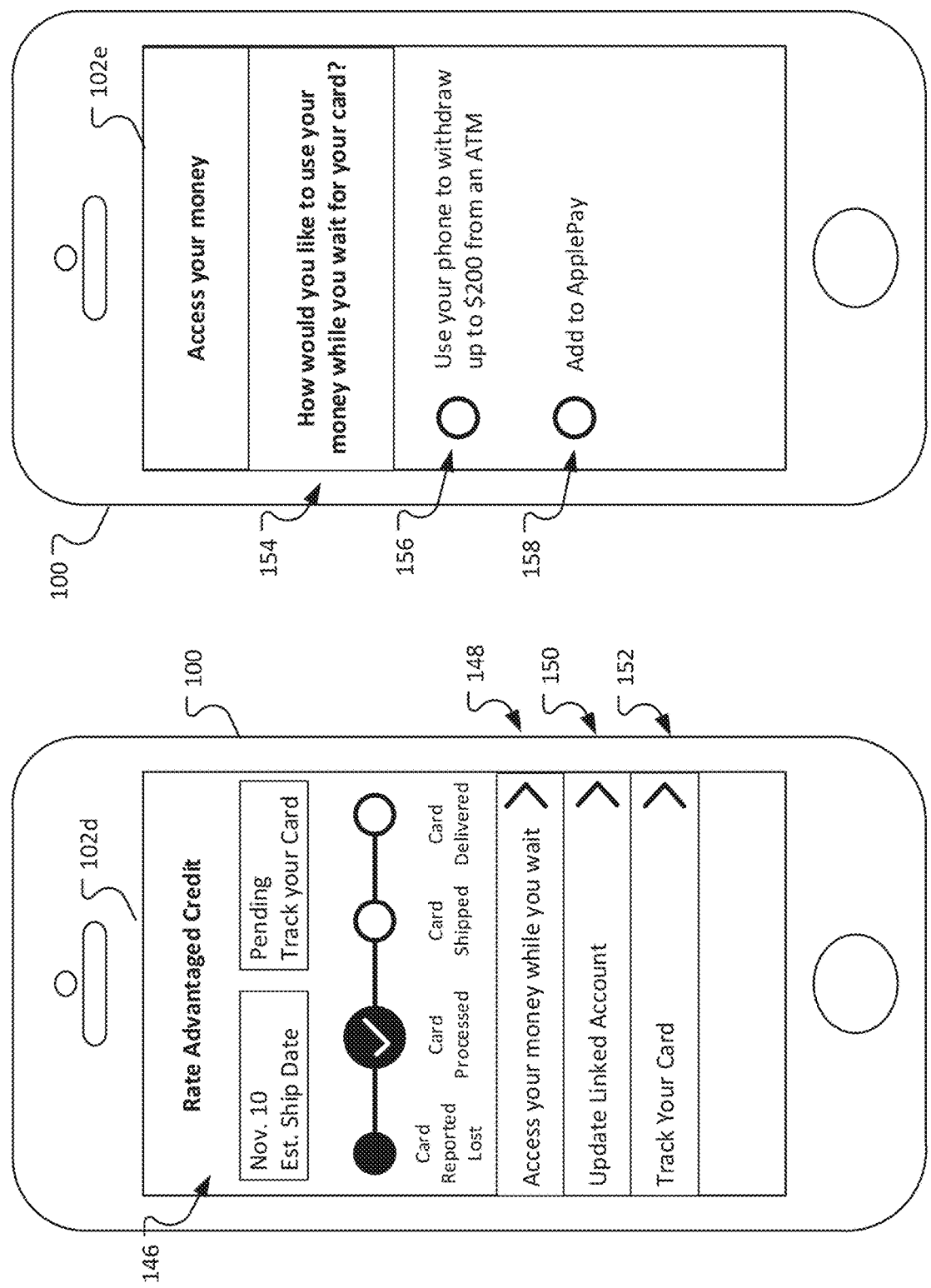

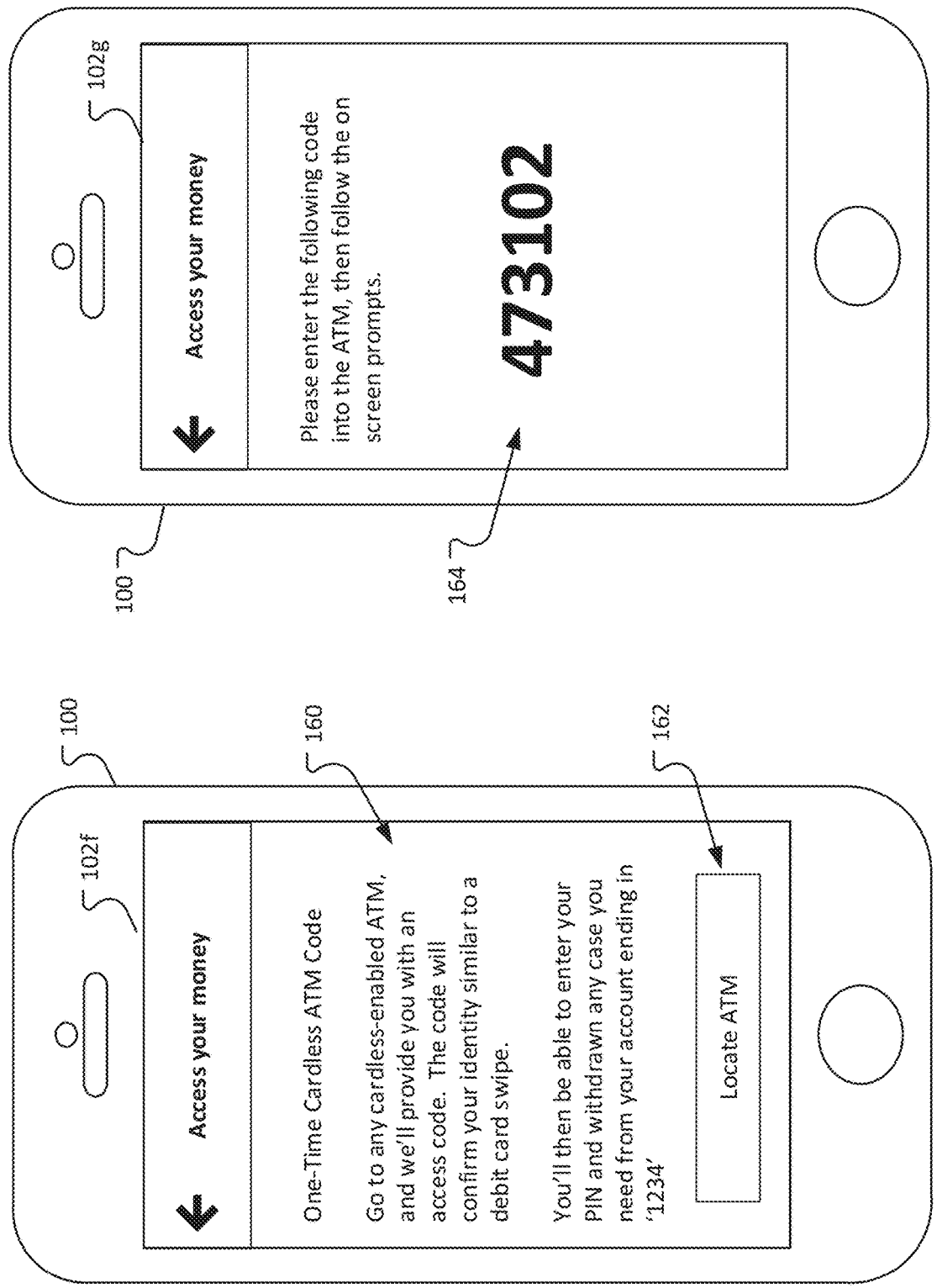

US 11,232,436 B1

TECHNICAL SOLUTIONS TO LOST CREDIT CARDS

CROSS-REFERENCE TO RELATED APPLICATIONS

This application claims priority under 35 U.S.C. § 119 to U.S. Application Ser. No. 62/725,067, filed on Aug. 30, 2018 and entitled "Technical Solutions to Lost Credit Cards," the entire contents of which is incorporated by reference herein.

BACKGROUND

Mobile banking is a service provided by a bank or other financial institution that allows its customers to conduct financial transactions remotely using a mobile device such as a smartphone or tablet. Unlike the related internet banking, it uses software, usually called an app, provided by the financial institution for the purpose. Mobile banking is usually available on a 24-hour basis. Some financial institutions have restrictions on which accounts may be accessed through mobile banking, as well as a limit on the amount that can be transacted.

SUMMARY

In general, one innovative aspect of the subject matter described in this specification can be embodied in methods that include, in response to determining that a user has reported a card associated with an account as lost or stolen, providing a user interface option to associate the account with a digital wallet. The methods also include, in response to receiving a request from a user associating the account with the digital wallet absent associating a card associated with the account with the digital wallet.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The user may report that the card has been lost or stolen through an application executing on a mobile device. The application may enable a user to lock the card so that the card cannot be used to charge to the account. The method may include the acts of receiving a request from a user to obtain funds from the account, establishing a one time use code to identify the user at a cardless enabled automatic teller machine, and enabling the user to obtain the requested funds by providing the one time user code to the cardless enabled automatic teller machine.

DETAILED DESCRIPTION

Having a credit card lost or stolen is both stressful and inconvenient. Traditionally, once a card is lost or stolen, the cardholder has to call the issuer, report the loss, and then wait for a period of time while a new card is printed and issued. However, integrating backend system and computer processes, using, for example, a cardholders smart device (such as a smartphone) together with integrated backend systems can minimize the disruptive effects on the cardholder.

Figure 1B:
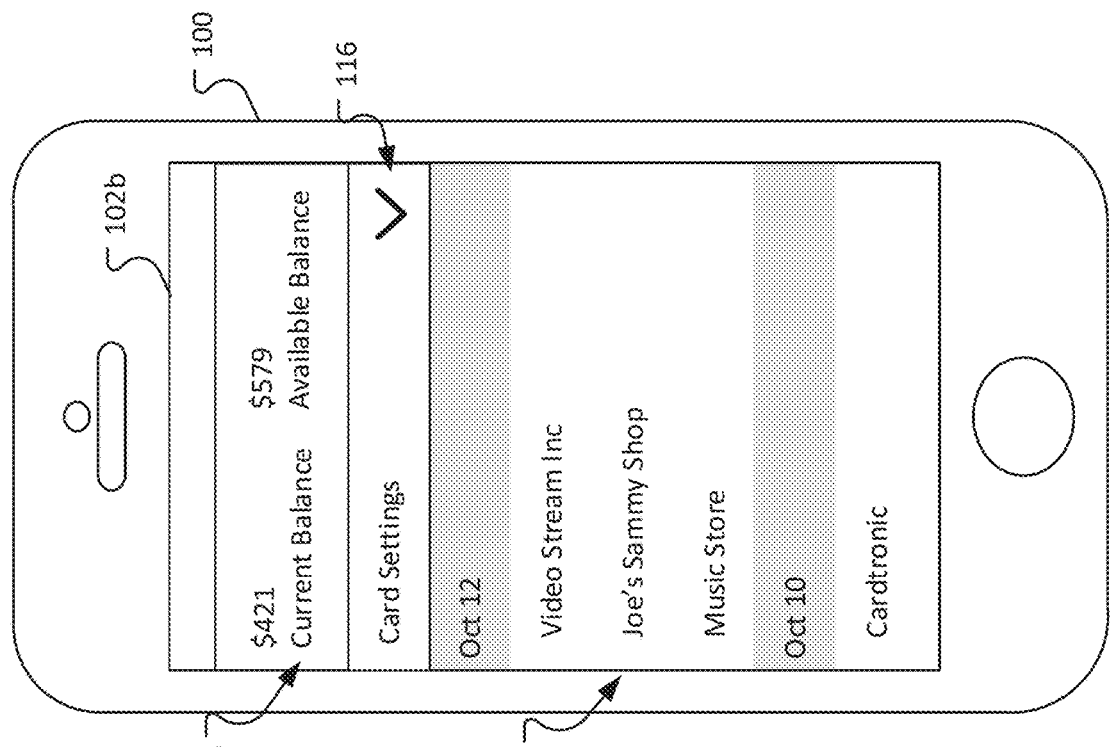
FIGS. 1A-O illustrate user interfaces on a mobile device.
Figure 1A:
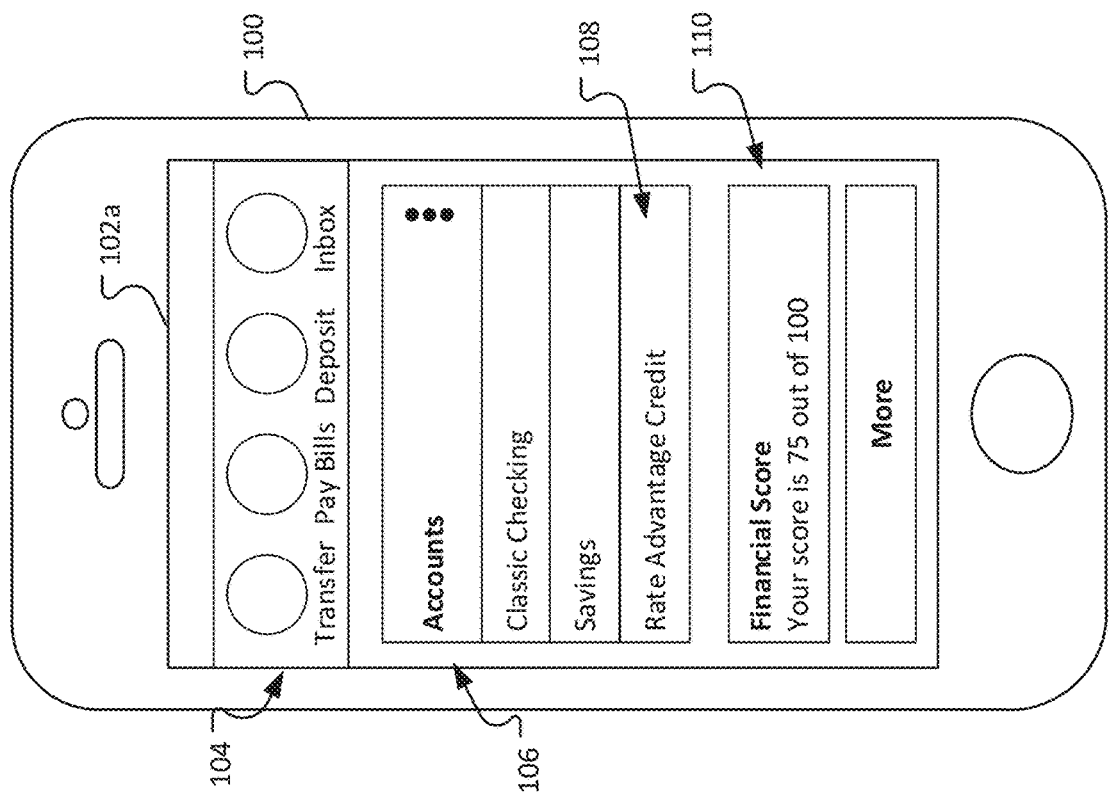

FIGS. 1A-O illustrate user interfaces on a mobile device. The user interface 102 may be presented on a display of the mobile device 100 (for example, a smart phone, tablet, or other similar device).

FIG. 1A shows a user interface 102a of a banking application executing on a mobile device 100. The user interface 102a can include selectable icons representing menu options 104, and a list of accounts 106. Selecting the selectable icons representing the menu options 104 can enable a user of the mobile device 100 to, for example, transfer money, pay bills, deposit funds, and receive mail. Selecting the selectable icons representing the list of accounts 106 can allow a user to access information corresponding to, for example, a checking account, a savings account, and a credit card account 108. The user interface 102 can include one or more graphical representations representing other information, such as a financial score 110 of the user.

FIG. 1B shows a user interface 102b of the banking application rendered on a display of the mobile device 100 resulting from the user selecting the selectable icon representing the credit card account 108. The user interface 102b includes one or more graphical representations representing information associated with an account balance 118 and transaction history 112 of the account. The user interface 102b includes a selectable icon that allows the user of the mobile device 100 to access information related to the account settings 116 of the financial account.

FIG. 1C shows a drop-down menu 119 appearing on the user interface 102b of the banking application resulting from the user selecting the selectable icon that allows the user to access information related to the account settings 116 of the financial account. The drop-down menu 119 includes one or more selectable icons that, when selected by the user, allow the user to perform actions on an electronic card corresponding to the financial account. For example, the user can select an icon to report a lost or stolen card 120, lock the card 122, order a replacement card 124, add the card to a digital wallet 126, or report fraud 128, FIG. 1D. shows a confirmation screen 130 appearing as an overlay on the user interface 102b in response to selecting one of the selectable icons of the drop-down menu 119. For example, in the shown implementations, the user selects the lock card icon 122 of the drop-down menu 119, and a confirmation screen 130 appears on the user interface 102b to prompt the user to confirm that they would like to lock the card. The confirmation screen 130 informs the user that the card will be declined and cannot be used until it is unlocked. The confirmation screen includes one or more selectable icons that the user can select to confirm that they would like to lock the card, such as the lock icon 132.

Figure 1F:
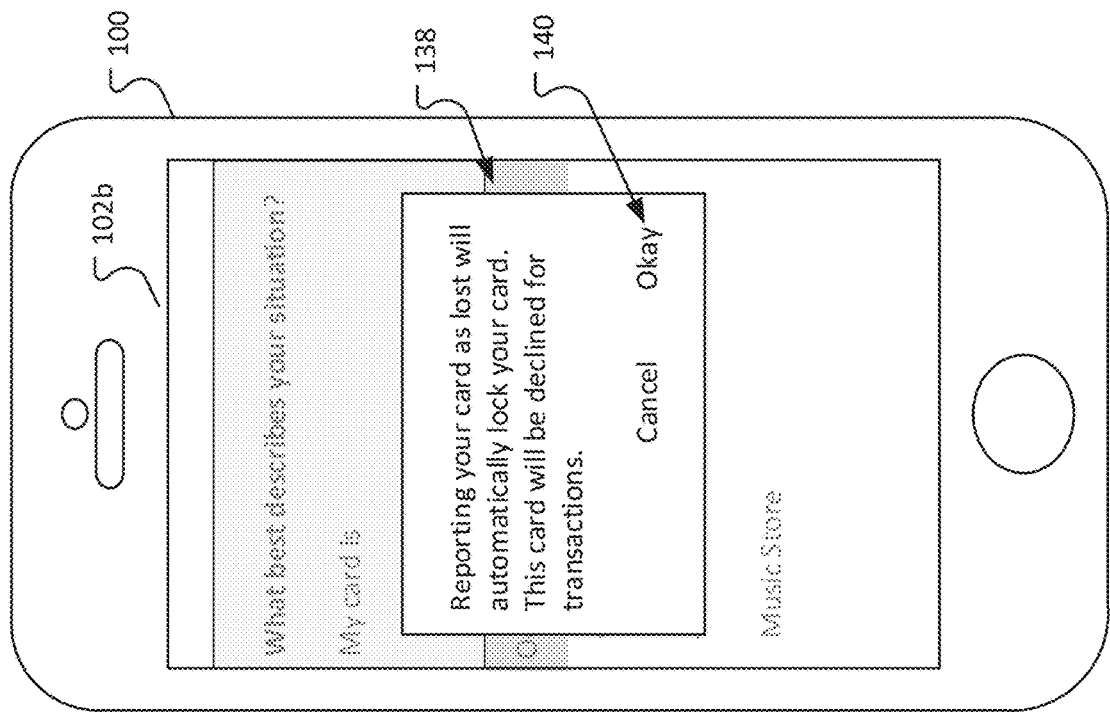
Figure 1E:
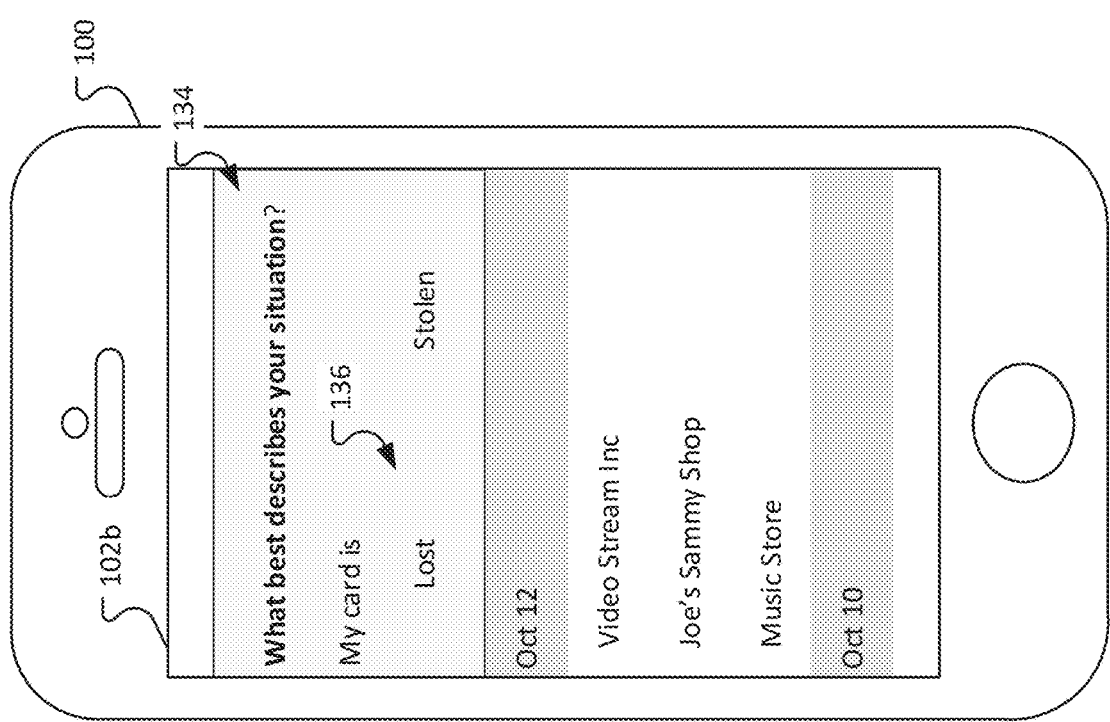

FIG. 1E. shows an information gathering screen 134 appearing as an overlay on the user interface 102b in response to selecting one of the selectable icons of the drop-down menu 119. For example, in the shown implementation, the user selects the report the card as lost or stolen icon 120 of the drop-down menu 119. As a result, the information gathering screen 134 appears as an overlay on the user interface 102b The information gathering screen 102b includes one or more graphical representations 134 asking the user to best describe the current situation of the electronic card. The information gathering screen 102b also includes one or more selectable icons 136 that the user can use to indicate the current card is either lost or stolen.

FIG. 1F shows a confirmation screen 138 appearing as an overlay on the user interface 102b in response to selecting one of the selectable icons 136 of the information gathering screen 134. In the shown implementation, the user selected the selectable icon 136 indicating that the electronic card is lost. In response, the confirmation screen 138 is caused to appear as an overlay on the user interface 102b. The confirmation screen 128 informs the user that reporting the card as lost will cause the card to become locked. The confirmation screen 138 includes user selectable icons 140 that the user can use to confirm that the card is lost and should be locked, or cancel the reporting of the lost card.

Figure 1H:
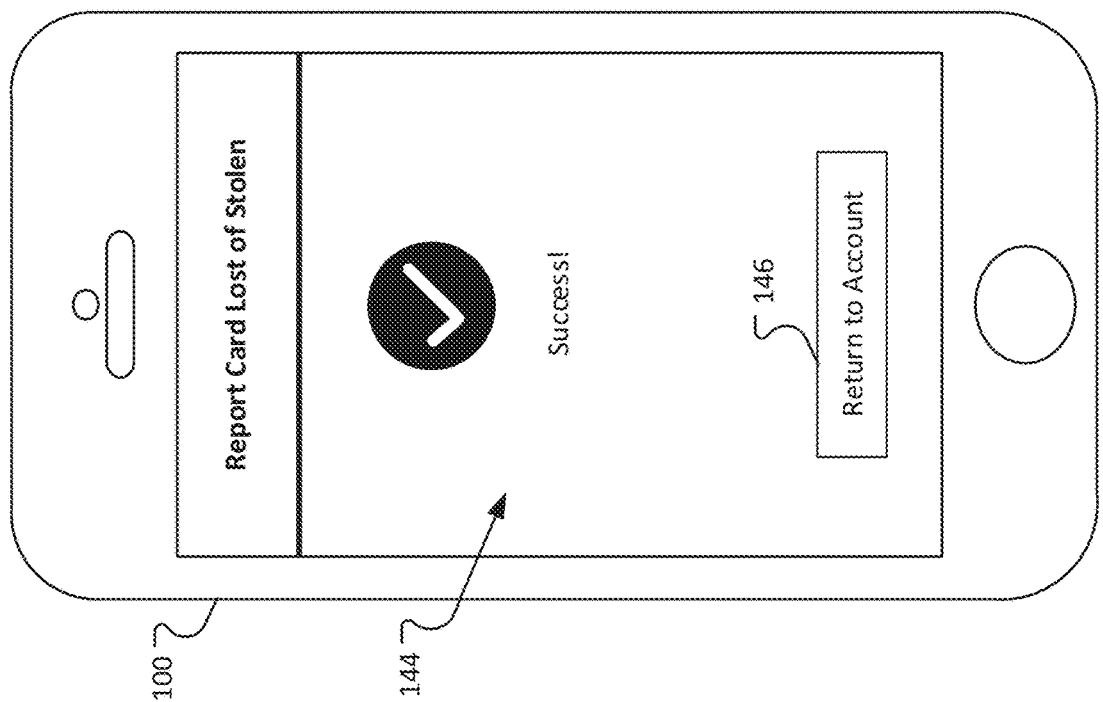
Figure 1G:
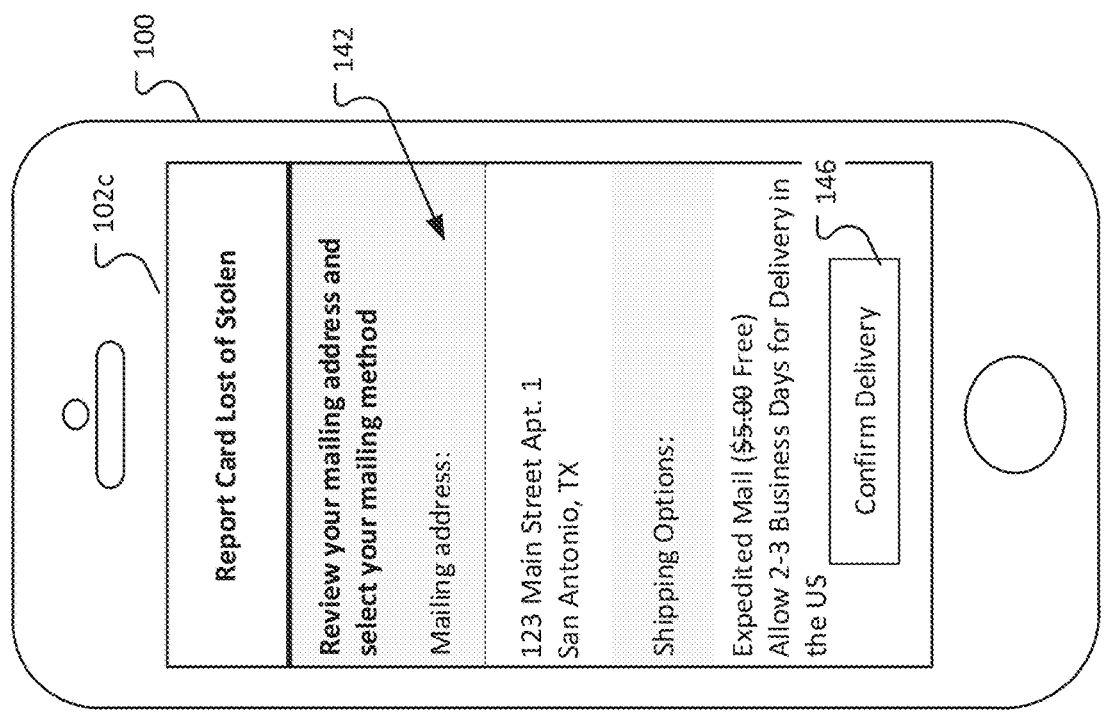

FIG. 1G shows a user interface 102c of the banking application rendered on a display of the mobile device 100 resulting from the user confirming that the card is lost or stolen. Once user confirm that the card is lost or stolen, the user interface 102c is rendered on the mobile device 100. The user interface 102c includes one or more graphical representations representing information 142 describing where and how the new card will be delivered. In some implementations, the user interface 102c provides selectable icons that can allow the user to select between different delivery options and locations. The user interface 102c includes a user selectable icon 146 that the user can select to confirm the delivery option and location.

FIG. 1H shows a confirmation screen 144 appearing as an overlay on the user interface 102c in response to selecting one of selectable icon 146 confirming the delivery option and location. The confirmation screen 144 can include one or more graphical representations 144 indicating that use has successfully completed the reporting process. The confirmation screen 144 includes a selectable icon 146, that when selected, causes the mobile device 100 to render the user interface 102b discussed previously with reference to FIG. 1B.

FIG. 1I shows a user interface 102d of the banking application rendered on a display of the mobile device 100. If, at a subsequent time, the user views the account associated with the reported lost card (for example, by selecting the rate advantage credit icon 108 of the user interface 102a discussed previously with reference to FIG. 1A), the user interface 102d can be automatically rendered on the mobile device in lieu of the user interface 102b discussed previously with reference to FIG. 1B. In some implementations, the user interface 102d can be an overlay appearing over the user interface 102b discussed previously with reference to FIG. 1B. The user interface 102d includes one or more graphical representations 146 representing tracking information. The tracking information can inform the user about the current state of the card processing (in this example, that the card was reported lost, the card has been processed, the card has been shipped, and the card has been delivered). The tracking information can also provide an estimated ship or delivery date and the ability to track the shipment. The user interface 102d includes one or more selectable icons allowing a user to perform one or more actions corresponding to the account. In the shown implementation, the user interface 102d includes a selectable icon 148 that allows a user to access money from the account while the user waits for the card to be delivered, a selectable icon 150 that allows a user to update an account linked to the card, and an icon 152 that allows the user to obtain additional tracking information corresponding to the card.

FIG. 1J shows a user interface 102e of the banking application rendered on a display of the mobile device 100 resulting from the user selecting the access your money icon 148. If the user selects the access your money icon 148, the mobile device 100 is caused to render the user interface 102e that the user can use to select between one or more options for accessing their funds associated with the reported card. The user interface 102e includes one or more graphical representations 154 that prompt the user to select an option for accessing their funds. The user interface 102e includes one or more selectable icons that the user can select to indicate how they would like to access their funds. In the shown implementations, the user interface 102e includes an icon 156 indicating that the user would like to use the mobile device 100 to withdraw money from an automatic teller machine (ATM) and an icon 158 indicating that the user would like to link the account to a digital wallet.

FIG. 1k shows a user interface 102f of the banking application rendered on a display of the mobile device 100 resulting from the user selecting the icon 156 of the user interface 102e indicating that the user would like to use the mobile device 100 to withdraw money from an ATM. As shown, the user interface 102f displays one or more graphical representations 160 providing information to the user on how to use an ATM to access their money without their card. The user interface 102f also includes a user selectable icon 162 that, when selected by the user, enables the user to locate a compatible ATM. For example, selecting the icon 162 may cause the user interface 102f to display a geographical representation (for example, a digital map) that identifies the location of the user and the location of nearby compatible ATMs (for example, all compatible ATMs within a 3 mile radius of the user's current location).

FIG. 1L shows a user interface 102g of the banking application rendered on a display of the mobile device 100 resulting from the user presenting the mobile device 100 to an identified ATM. When the user presents the mobile device 100 to the identified ATM (for example, as later described with reference to FIG. 2), one or more graphical representations indicating the access code 164 are displayed on the user interface 102g. The user can enter the access code 164 that is displayed on the user interface 102g of the mobile device 100, at which point the ATM will provide the user with the predetermined amount of money.

Figure 1N:
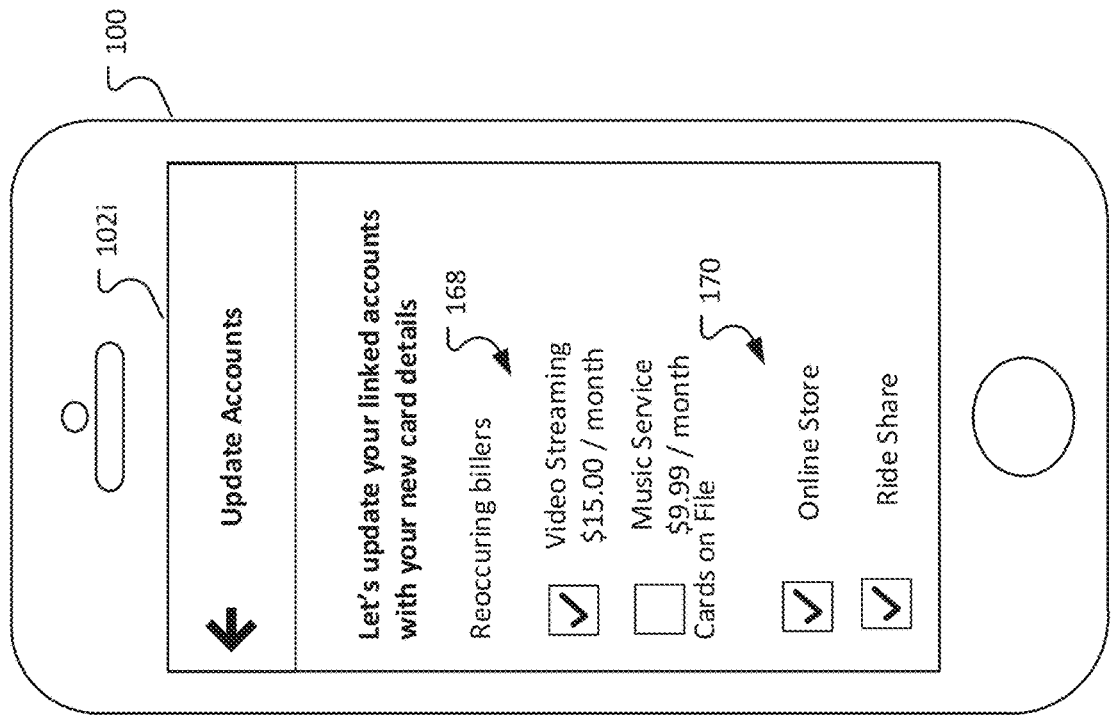
Figure 1M:
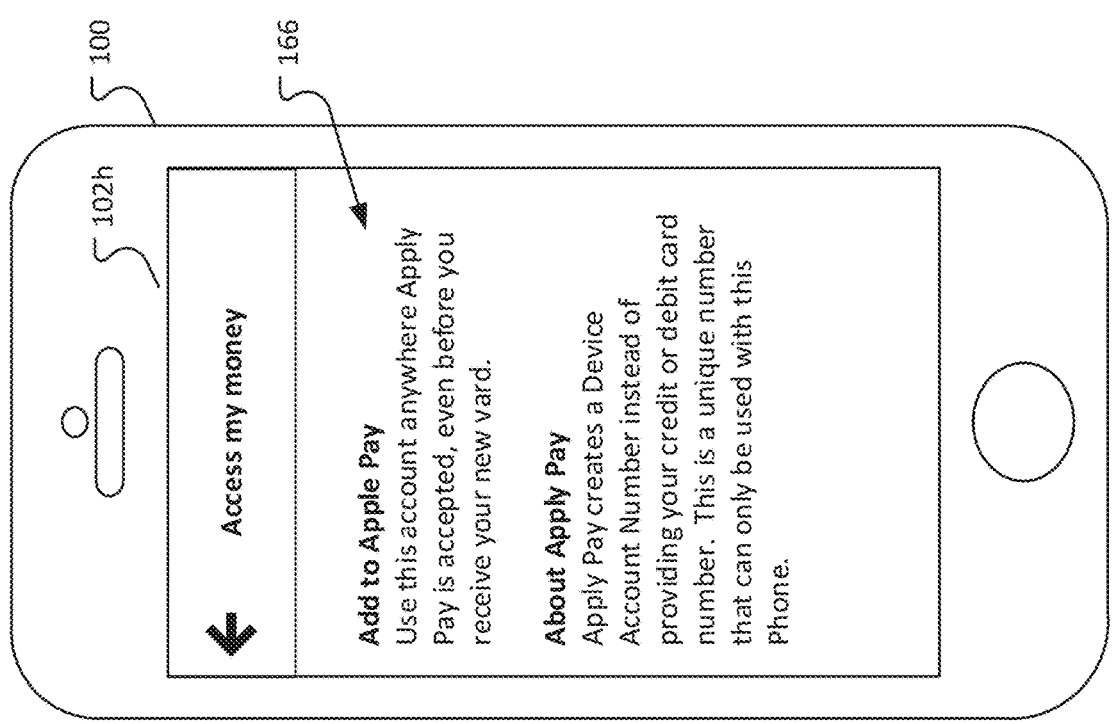
Figure 10:
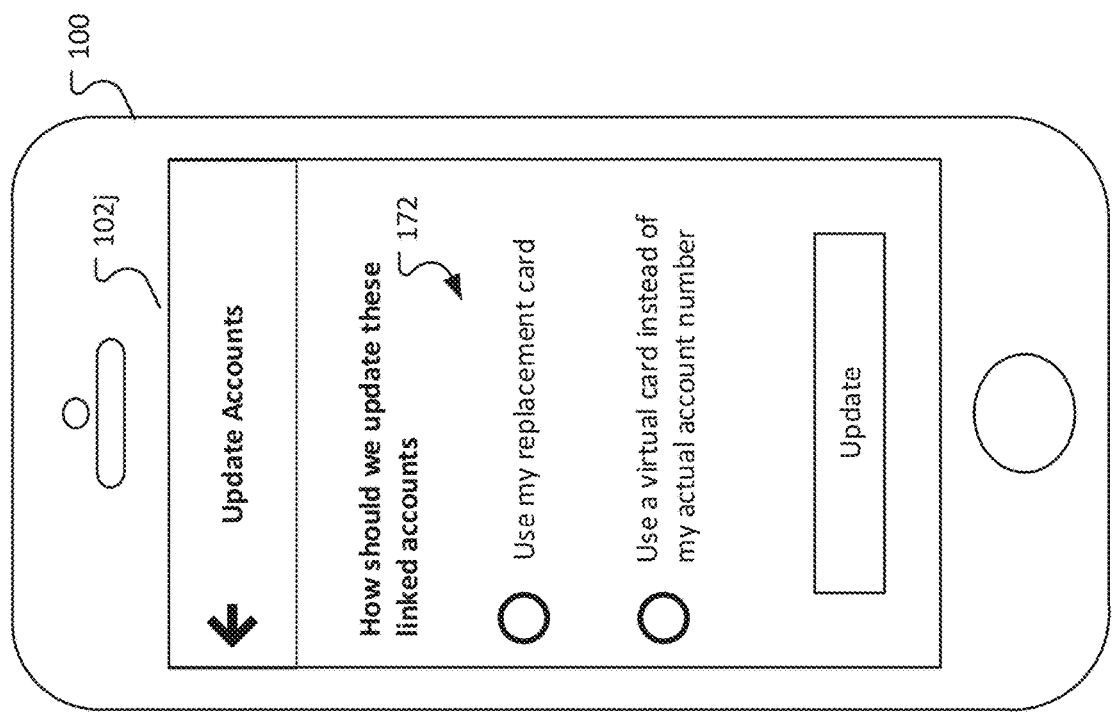

FIG. 1M shows a user interface 102h of the banking application rendered on a display of the mobile device 100 resulting from the user selecting the icon 158 of the user interface 102e indicating that the user would like to link their account to a digital wallet. The user interface 102h includes one or more graphical representations 166 informing the user of the process of linking their account to the digital wallet. In some implementations, the one or more graphical representations 166 inform the user that linking the account to the digital wallet includes generating an account number associated with the mobile device 100 and linking that account number with the user's account (in this example, the credit account).

FIG. 1N shows a user interface 102i of the banking application rendered on a display of the mobile device 100 resulting from the user selecting the icon 150 of the user interface 102d indicating that the user would like to update an account linked to the card. The system can analyze the transaction history associated with the account and identify reoccurring billers (billers who regularly charge the same amount, for example for subscription service) and billers who occur semi-regularly and are likely to have the card on file. As shown, the user interface 102i can display one or more user selectable icons 168 associated with the reoccurring billers and one or more user selectable icons 170 associated with the billers likely to have the card on file. In some implementations, the system may have a list of billers that are known to be a reoccurring billers and a list of billers that are known to maintain cards on file. The user can select the one or more user selectable icons 168, 170 to update the corresponding biller's records with the account information of the credit/debit card associated with that selected accounts (as illustrated by the checkmarks in the boxes next to the corresponding billers in FIG. 1N).

FIG. 1O, shows a user interface 102j of the banking application rendered on a display of the mobile device 100 resulting from the user selecting the one or more icons 168, 170 of the user interface 102i indicating that the user would like to update an account linked to the card. Once the user has selected the accounts that they would like to have automatically updated, the user interface 102j displays one or more selectable icons 172, presenting the user with the options of using the replacement card number or using a virtual card number instead of the actual account number for updating their accounts.

Figure 2:
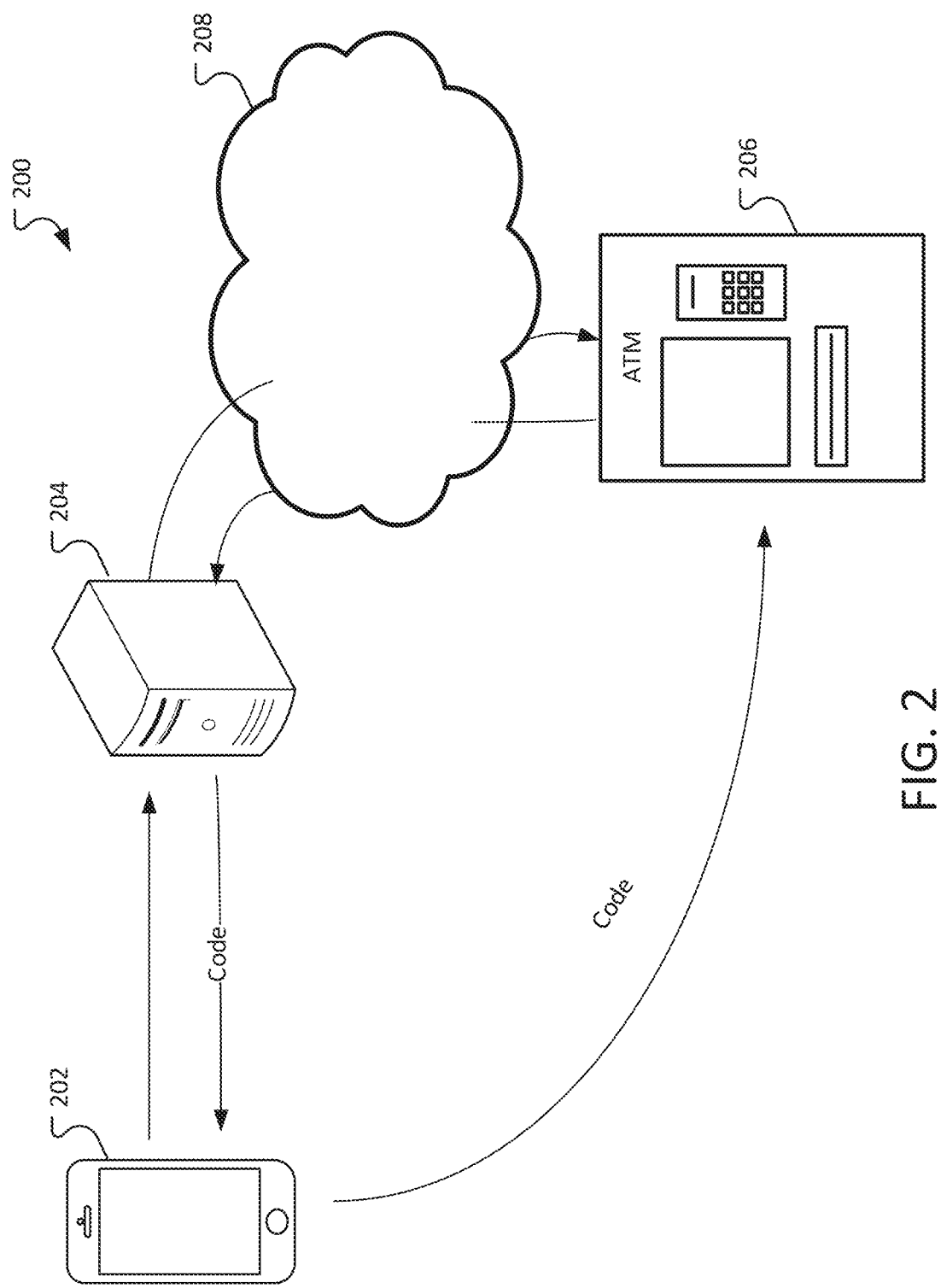
FIG. 2 illustrates an exemplary environment for providing access to funds using a smart device at a cardless-enabled ATM.

FIG. 2 illustrates an example environment 200 for providing access to funds using a mobile device 202 at a cardless-enabled ATM 206. As described previously, a user selects an option on a mobile device 202 to receive funds. The mobile device 202 communicates the request to a server 204. The server 204 can be, for example, a server associated with a financial institution associated with the lost/stolen card. In general, a cardless-enabled ATM can refer to an ATM that can interact with a mobile device and an issuing financial institution to enable a user to access funds without having a physical card.

When the user approaches the ATM 206, the user provides the mobile device 202 to the ATM 206, for example, using near field communication. The ATM 206 can retrieve the user's information from the mobile device 202 when the mobile device 202 is presented to the ATM 206. The ATM 206 sends a request to the server of the issuing bank.

The server 204 sends a one-time use code to the smart device 202. The user then enters the one-time code at the ATM 206. The one-time code acts as the user's PIN, enabling the user to access the requested amount.

Figure 3:
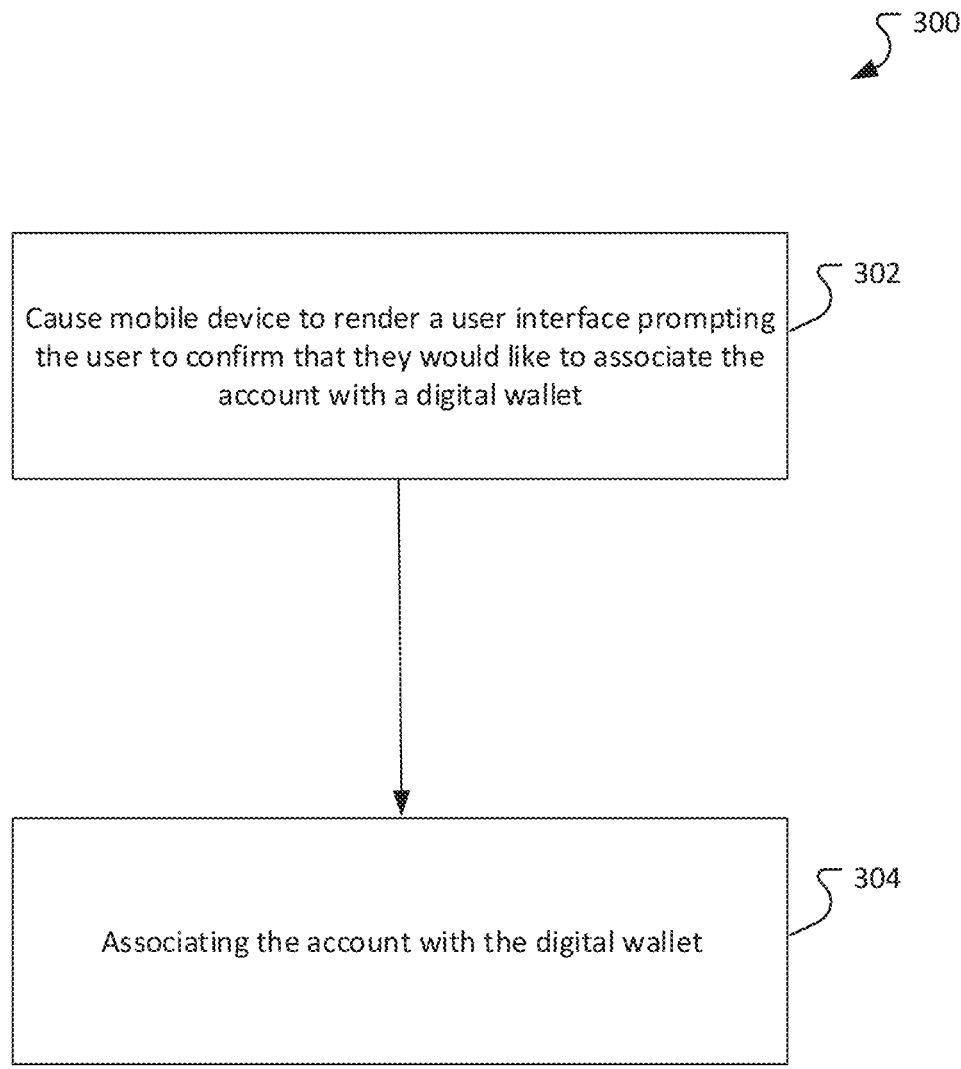
FIG. 3 is a flow chart of an example of a process for providing access to an account.

FIG. 3 is a flow chart of an example of a process for providing access to an account. As described above, it can be inconvenient and difficult for a user who experiences the loss or theft of a credit card. One of the issues includes the inability to access funds while waiting for a replacement card to be issued. The process 300 described below enables a user to access their account using a digital wallet, even when the user does not have a currently valid card.

In response to determining that a user has reported a card associated with an account as lost or stolen, the process 300 provides 302 causes a mobile device of the user to render a user interface comprising one or more selectable icons prompting the user to confirm that they would like to associate the account with a digital wallet, and in response to receiving selection data indicating that the user would like to associate the account with a digital wallet, the process 300 associates the account with the digital wallet without associating a card corresponding with the account with the digital wallet.

In some implementations, associating the account with the digital wallet may include asking the user to log into an application installed on the mobile device associated with the digital wallet. The application may be provided by the financial institution that controls the account. The user logs into the application and the application coordinates with the digital wallet to establish a digital wallet entry for the account.

Figure 4:
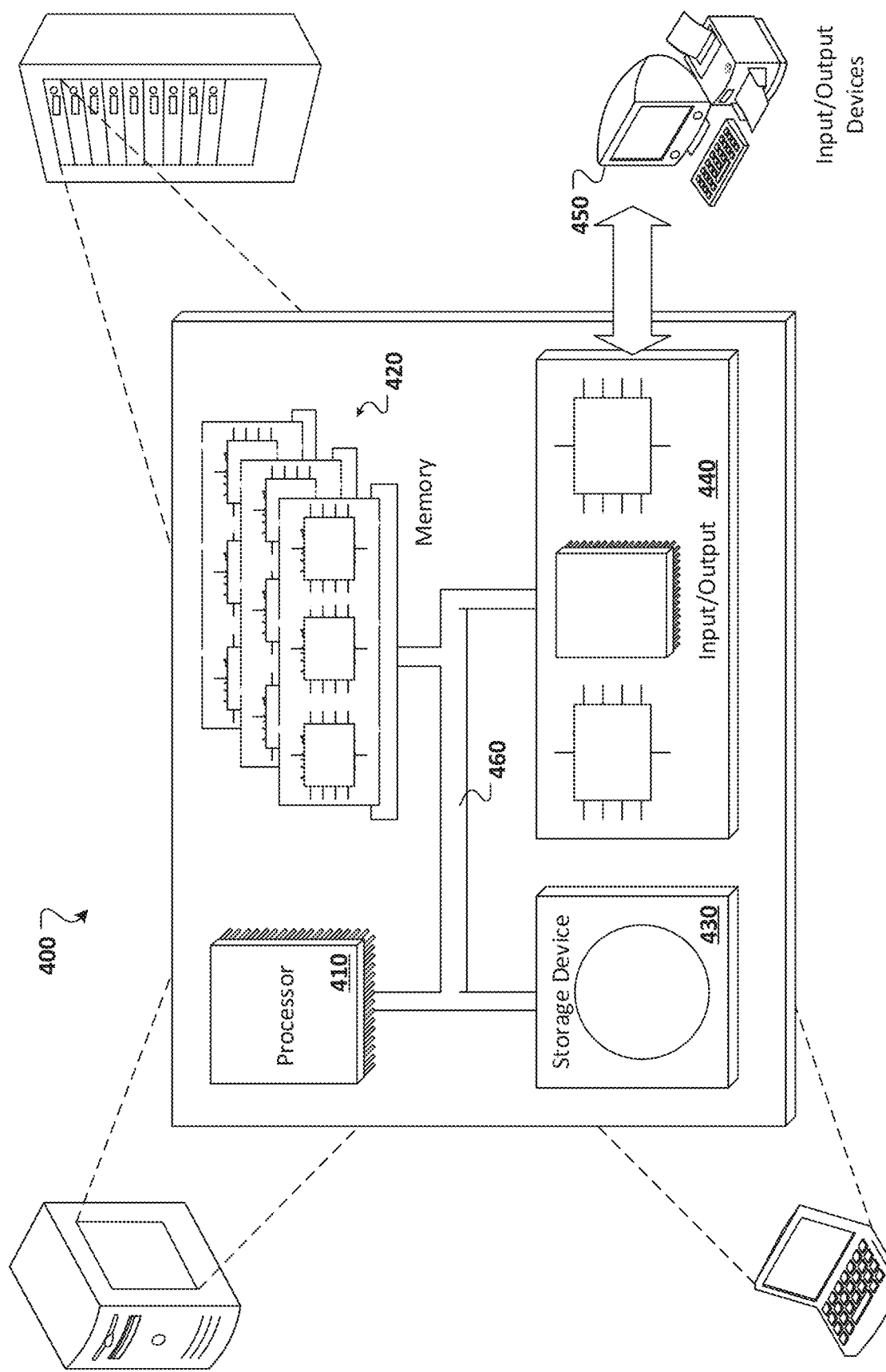
FIG. 4 depicts an example computing system, according to implementations of the present disclosure.
Like reference numbers and designations in the various drawings indicate like elements.

FIG. 4 depicts an example computing system, according to implementations of the present disclosure. The system 400 may be used for any of the operations described with respect to the various implementations discussed herein. The system 400 may include one or more processors 410, a memory 420, one or more storage devices 430, and one or more input/output (I/O) devices 450 controllable via one or more I/O interfaces 440. The various components 410, 420, 430, 440, or 450 may be interconnected via at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks, such as the network(s) 110, using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A method comprising,
   determining that a user has reported a card associated with an account of the user as lost or stolen;
   in response to determining that the user has reported the card associated with the account of the user as lost or stolen, causing a mobile device of the user to render a user interface comprising one or more selectable icons prompting the user to confirm that they would like to associate the account with a digital wallet;
   receiving, via the user interface, selection data indicating that the user would like to associate the account with the digital wallet;
   in response to receiving selection data indicating that the user would like to associate the account with the digital wallet, associating the account with the digital wallet without associating the card corresponding to the account with the digital wallet;
   receiving, via the user interface, a request from the user to obtain funds from the account using the mobile device;
   causing a display of a digital map on the user interface, the digital map identifying a current location of the user and locations of cardless enabled automatic teller machines (ATMs) within a predetermined distance from the user's current location;
   determining that the mobile device has been presented to a first cardless enabled ATM of the cardless enabled ATMs based on near field communication between the ATM mobile device and the first cardless enabled ATM;

in response to determining that the mobile device has been presented to the first cardless enabled ATM based on near field communication between the ATM mobile device and the first cardless enabled ATM, causing a display of a one time use code on the user interface; and enabling the user to obtain the requested funds by providing the one time use code to the first cardless enabled ATM.

2. The method of claim 1, wherein the user reports that the card has been lost or stolen through an application executing on the mobile device.

3. The method of claim 2, wherein the application enables a user to lock the card so that the card cannot be used to charge to the account.

4. A non-transitory computer storage medium encoded with computer program instructions that when executed by one or more computers cause the one or more computers to perform operations comprising:

determining that a user has reported a card associated with an account of the user as lost or stolen;

in response to determining that the user has reported the card associated with the account of the user as lost or stolen, causing a mobile device of the user to render a user interface comprising one or more selectable icons prompting the user to confirm that they would like to associate the account with a digital wallet;

receiving, via the user interface, selection data indicating that the user would like to associate the account with the digital wallet;

in response to receiving selection data indicating that the user would like to associate the account with the digital wallet, associating the account with the digital wallet without associating the card corresponding to the account with the digital wallet;

receiving, via the user interface, a request from the user to obtain funds from the account using the mobile device;

causing a display of a digital map on the user interface, the digital map identifying a current location of the user and locations of cardless enabled automatic teller machines (ATMs) within a predetermined distance from the user's current location;

determining that the mobile device has been presented to a first cardless enabled ATM of the cardless enabled ATMs based on near field communication between the ATM mobile device and the first cardless enabled ATM;

in response to determining that the mobile device has been presented to the first cardless enabled ATM based on near field communication between the ATM mobile device and the first cardless enabled ATM, causing a display of a one time use code on the user interface; and enabling the user to obtain the requested funds by providing the one time use code to the cardless enabled ATM.

5. The non-transitory computer storage medium of claim 4, wherein the user reports that the card has been lost or stolen through an application executing on the mobile device.

6. The non-transitory computer storage medium of claim 5, wherein the application enables a user to lock the card so that the card cannot be used to charge to the account.

7. A system comprising:

one or more computers and one or more storage devices storing instructions that are operable, when executed by the one or more computers, to cause the one or more computers to perform operations comprising:

determining that a user has reported a card associated with an account of the user as lost or stolen;

in response to determining that the user has reported the card associated with the account of the user as lost or stolen, causing a mobile device of the user to render a user interface comprising one or more selectable icons prompting the user to confirm that they would like to associate the account with a digital wallet;

receiving, via the user interface, selection data indicating that the user would like to associate the account with the digital wallet;

in response to receiving selection data indicating that the user would like to associate the account with the digital wallet, associating the account with the digital wallet without associating the card corresponding to the account with the digital wallet;

receiving, via the user interface, a request from the user to obtain funds from the account using the mobile device;

causing a display of a digital map on the user interface, the digital map identifying a current location of the user and locations of cardless enabled automatic teller machines (ATMs) within a predetermined distance from the user's current location;

determining that the mobile device has been presented to a first cardless enabled ATM of the cardless enabled ATMs based on near field communication between the mobile device and the first cardless enabled ATM;

in response to determining that the mobile device has been presented to the first cardless enabled ATM based on near field communication between the mobile device and the first cardless enabled ATM, causing a display of a one time use code on the user interface; and enabling the user to obtain the requested funds by providing the one time use code to the cardless enabled ATM.

8. The system of claim 7, wherein the user reports that the card has been lost or stolen through an application executing on the mobile device.

9. The system of claim 8, wherein the application enables a user to lock the card so that the card cannot be used to charge to the account.

10. The method of claim 1, wherein the user interface comprises one or more selectable icons that allow the user to select between different delivery options and locations for receiving a new card.

11. The method of claim 10, wherein the user interface comprises one or more graphical representations representing tracking information of the new card.

12. The method of claim 11, wherein the tracking information provides an estimated delivery date and an ability to track a shipment of the new card.

13. The non-transitory computer storage medium of claim 4, wherein the user interface comprises one or more selectable icons that allow the user to select between different delivery options and locations for receiving a new card.

14. The non-transitory computer storage medium of claim 13, wherein the user interface comprises one or more graphical representations representing tracking information of the new card.

15. The non-transitory computer storage medium of claim 14, wherein the tracking information provides an estimated delivery date and an ability to track a shipment of the new card.

16. The system of claim 7, wherein the user interface comprises one or more selectable icons that allow the user to select between different delivery options and locations for receiving a new card.

17. The system of claim 8, wherein the user interface comprises one or more graphical representations representing tracking information of the new card.

18. The method of claim 1, wherein the request from the user to obtain funds from the account using the mobile device comprises is associated with a pre-determined amount of funds, and wherein enabling the user to obtain the requested funds by providing the one time use code to the first cardless enabled ATM comprises causing the first cardless enabled ATM to dispense the pre-determined amount of funds in response to the user providing the one time use code to the first cardless enabled ATM.

19. The method of claim 1, wherein the card is at least one of a credit card or a debit card.

\* \* \* \* \*